3,082,224
NOVEL 16α-METHYL-3,5-PREGNADIENES
AND PROCESSES
Leonard M. Weinstock, Highland Park, N.J., assignor to Merck & Co., Inc., Rahway, N.J., a corporation of New Jersey
No Drawing. Filed Nov. 18, 1960, Ser. No. 70,119
4 Claims. (Cl. 260—397.45)

This invention is concerned generally with novel 3-enol ethers of Δ⁴-pregnene-11β-ol-3-ones and with processes of preparing the same. More particularly, it relates to novel 3-enol ethers of the Δ⁴-pregnene-11β,17α,21-triol-3,20-diones and the 21-esters thereof, which are potent anti-inflammatory agents, and to a novel method for preparing these compounds, starting with the corresponding Δ⁴-pregnene-11β,17α,21-triol-3,20-dione.

Processes are known for the manufacture of the 3-enol ethers of Δ⁴-pregnene-3-ones (the 3-alkoxy-3,5-pregnadienes), for example, by stirring together a mixture of the Δ⁴-pregnene-3-one with an alkyl orthoformate in the presence of a strong acid using a solvent such as dioxane. However, attempts to apply such methods to the formation of the 3-enol ethers of Δ⁴-pregnene-3-ones which have present an 11β-hydroxy group together with an unsubstituted hydrogen atom at position 9, are ordinarily unsuccessful due to substantial dehydration to the corresponding Δ⁹⁽¹¹⁾-steroid under the reacting conditions employed.

It has now been found that the 3-enol ethers of the Δ⁴-pregnene-11β-ol-3-ones which can undergo Δ⁹⁽¹¹⁾-dehydration, are readily obtained in good yields by stirring together a mixture of the Δ⁴-pregnene-11β-ol-3-ones with an alkyl orthoformate in the presence of a strong acid, using the corresponding alkanol as the only solvent in the reaction.

In a preferred embodiment of my invention, the 3-enol ethyl ethers which have both a hydroxy group at position 11 and an unsubstituted hydrogen at position 9 (whereby dehydration to the corresponding Δ⁹⁽¹¹⁾-steroid is possible) are prepared by stirring together a mixture of the Δ⁴-pregnene-11β-ol-3-one with an alkyl orthoformate and the corresponding alkanol in the presence of an acid catalyst, such as a strong mineral acid, or an organic sulfonic acid. For example, a mixture of the 3-keto-steroid, absolute ethanol, ethyl orthoformate and 2,4-dinitrobenzenesulfonic acid are stirred together at room temperature until solution takes place. The mixture is stirred for a short time longer and then neutralized with an organic base, such as pyridine. The solution is concentrated to about half-volume, water is added, and the concentration is continued until crystallization of the 3-enol ethyl ether results. Employing this method, Δ⁹⁽¹¹⁾-dehydration is reduced to less than 10% and the yields of the desired 3-enol ether usually amount to 65 to 90%.

The 3-enol methyl-ethers are prepared by substituting methyl orthoformate and methanol for the ethyl orthoformate and ethanol in this reaction. The 3-enol propyl ethers are prepared by substituting propyl orthoformate and propanol for the ethyl orthoformate and ethanol, and increasing the reaction time.

It is an advantage of this invention that the quantity of the alkyl orthoformate is not critical. For each mole of the steroid, one to fifteen moles of the alkyl orthoformate ester may be used. Usually, 1 ml. of the ester per gram of the steroid is satisfactory.

Any strong acid will function as a catalyst. Examples of acids suitable for this reaction include mineral acids such as hydrochloric, hydrobromic, sulfuric acids, and organic sulfonic acids such as methane sulfonic acid, p-toluenesulfonic acid, 2,4-dinitrobenzene sulfonic acid and the like. The amount of acid to be used is not critical. Approximately 1–100 mole percent (based on the weight of the steroid) can be employed. Approximately 5–25 mole percent is best.

The reaction can be carried out at 0° to 100° C. A temperature of 25–50° C. is usually preferred. The reaction time varies with the temperature employed and may vary from about 15 minutes to about 2 hours at room temperature.

The method of our invention is especially useful for the production of the 3-enol ethers of Δ⁴-pregnenes which can undergo Δ⁹⁽¹¹⁾-dehydration, i.e. Δ⁴-pregnene-11β-ol-3-ones which have an 11β-hydroxy group together with a 9α-hydrogen, but it is not limited thereto. It is an advantage of our process that it can be used also for the preparation of the 3-enol ethers of the Δ⁴-pregnenes in which no Δ⁹⁽¹¹⁾-dehydration is possible, for example, the 3-enol ethers of 9α-fluoro-4-pregnene-11β,17α-21-triol-3,20-dione, 4-pregnene-17α,21-diol-3,11,20-trione and the 21-esters thereof.

According to the process of our invention the starting material may be either the 4-pregnene-11β,17α,21-triol-3,20-dione, or the 21-esters thereof. Illustrative of the 21-esters contemplated above are alkanoates such as acetate, propionate, and butyrate, aryl esters such as benzoate and sulfobenzoate, esters from dibasic organic esters such as the succinate, phthalate and those from poly-basic inorganic acids such as sulfate and phosphate.

The reaction takes place readily when substituents are present at other positions in the steroid molecule, for example, at the 6, 9 and 16 positions. Thus the starting materials which may be utilized in carrying out the novel process of our invention include compounds of the formula:

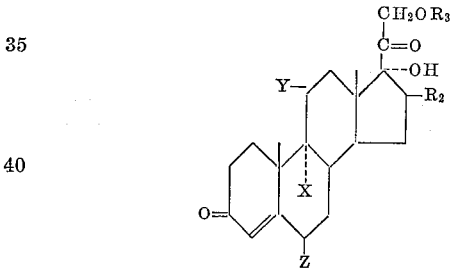

wherein $R_2$ stands for hydrogen or an alkyl group, $R_3$ is hydrogen or an acyl group, X is hydrogen or halogen, Y is hydrogen, hydroxy or keto and Z is hydrogen, halogen or an alkyl radical.

The products formed may be represented by the following formula:

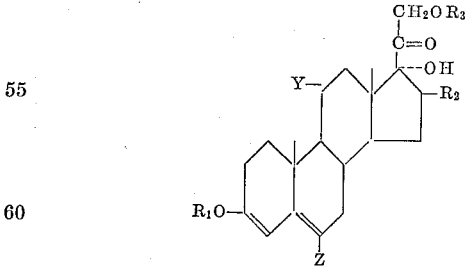

wherein $R_1$ stands for a lower alkyl group and $R_2$, $R_3$, X, Y and Z have the significance above defined.

The above described novel 3-enol ethers, produced in accordance with the present invention, possess high anti-inflammatory activity, considerably greater than that of the parent steroids, and are especially effective for the treatment of arthritis and related diseases since they can be administered for their cortisone-like action in low dosage thereby minimizing undesired side effects.

The following examples illustrate methods of carrying

Example 1

Ten grams of 4-pregnene-11β,17α,21-triol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-3,5-pregnadiene-11β,17α-21-triol-20-one, which has the following properties: M.P. 183–87° C.

U.V. $\lambda_{240}^{max.}$ E 19,550

Example 2

Ten grams of 4-pregnene-11β,17α,21-triol-3,20-dione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-3,5-pregnadiene-11β,17α,21-triol-20-one 21-acetate, which has the following properties: M.P. 197–99° C.

U.V. $\lambda_{241}^{max.}$ E 18,400

Example 3

Ten grams of 9α-fluoro-16α-methyl-4-pregnene-11β,17α,21-triol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-9α-fluoro-16α-methyl-3,5-pregnadiene-11β,17α,21-triol-20-one, which has the following properties: M.P. 183–88° C.

U.V. $\lambda_{240}^{max.}$ E 19,500

Alternately, the 3-ethoxy-9α-fluoro-16α-methyl-3,5-pregnadiene-11β,17α,21-triol-20-one can be prepared by the following procedure:

A mixture of two grams of 9α-fluoro-16α-methyl-4-pregnene-11β,17α,21-triol-3,20-dione, 15 ml. of dry dioxane, 0.2 ml. of absolute ethanol and 2 ml. of ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-9α-fluoro-16α-methyl-3,5-pregnadiene-11β,17α,21-triol-20-one.

Example 4

Ten grams of 16α-methyl-4-pregnene-11β,17α,21-triol-3,20-dione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-16α-methyl-3,5-pregnadiene-11β,17α,21-triol-20-one, which has the following properties: M.P. 189–191° C.

U.V. $\lambda_{240}^{max.}$ Eμ 19,600

Alternately, the 3-ethoxy-16α-methyl-3,5-pregnadiene-11β,17α,21-triol-20-one can be prepared by the following procedure:

A mixture of two grams of 16α-methyl-4-pregnene-11β,17α,21-triol-3,20-dione, 15 ml. dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-16α-methyl-3,5-pregnadiene-11β,17α,21-triol-20-one.

Example 5

Ten grams of 4-pregnene-17α,21-diol-3,11,20-trione, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. Concentration is continued until crystallization occurs. About 100 ml. of water is added and the product is filtered, washed well with water, and dried to give 3-ethoxy-3,5-pregnadiene-17α,21-diol-11,20-dione, which has the following properties: M.P. 154–56° C., U.V. $\lambda_{240}^{max.}$ Eμ 20,500

Alternately, the 3-ethoxy-3,5-pregnadiene-17α,21-diol-11,20-dione can be prepared by the following procedure:

A mixture of two grams of 4-pregnene-17α,21-diol-3,11,20-trione, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1–2 ml. of pyridine. Twenty-five ml. of water is slowly added and the resulting oil is scratched and seeded to induce crystallization. The product is filtered and washed with a mixture of 40% dioxane and water, and dried to give 3-ethoxy-3,5-pregnadiene-17α,21-diol-11,20-dione.

Example 6

Ten grams of 4-pregnene-17α,21-diol-3,11,20-trione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-3,5-pregnadiene-17α,21-diol-11,20-dione-21-acetate, which has the following properties: M.P. 197–99° C., U.V. $\lambda_{241}^{max.}$ Eμ 18,400

Alternately, the 3-ethoxy-3,5-pregnadiene-17α-21-diol-11-20-dione 21-acetate can be prepared by the following procedure:

A mixture of two grams of 4-pregnene-17α,21-diol-3,11,20-trione 21-acetate, 15 ml. of dry dioxane, 0.2 ml. ethyl orthoformate is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3 - ethoxy - 3,5 - pregnadiene - 17α, 21 - diol - 11,20-dione 21-acetate.

*Example 7*

Ten grams of 4-pregnene-17α,21-diol-3,11,20-trione 21-acetate, 100 ml. of n-propanol (distilled from calcium hydride), 10 ml. of propyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-propoxy-3,5-pregnadiene-17α,21-diol-11,20-dione 21-acetate.

*Example 8*

Ten grams of 9α-fluoro-16α-methyl-4-pregnene-17α,21-diol-3,11,20-trione 21-acetate, 100 ml. of absolute ethanol (distilled from calcium hydride), 10 ml. of ethyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-ethoxy-9α-fluoro-16α-methyl-3,5-pregnadiene-11β,17α,21-triol 21-acetate which has the following properties: M.P. 181–84° C., U.V. $\lambda_{240}^{max.}$ E$\mu$ 20,400

Alternately, the 3-ethoxy-9α-fluoro-16α-methyl-3,5-pregnadiene-11β,17α,21-triol 21-acetate, can be prepared by the following procedure:

A mixture of two grams of 9α-fluoro-16α-methyl-4-pregnene-17α,21-diol-3,11,20-trione 21-acetate, 15 ml. of dry dioxane, 0.2 ml. of absolute ethanol and 2 ml. ethyl orthoformate is treated with 1.4 ml. of 5% sulfuric acid in dioxane. The mixture is stirred at room temperature for one-half hour and then treated with 1-2 ml. of pyridine. Twenty-five ml. of water is slowly added and the resulting oil is scratched and seeded to induce crystallization. The product is filtered and washed with a mixture of 40% dioxane and water, and dried to give 3 - ethoxy - 9α - fluoro - 16α - methyl - 3,5 - pregnadiene-11β,17α,21-triol 21-acetate.

*Example 9*

Ten grams of 4-pregnene-11β,17α,21-triol-3,20-dione, 100 ml. of methanol (distilled from calcium hydride), 10 ml. of methyl orthoformate and 0.300 g. of 2,4-dinitrobenzenesulfonic acid are stirred at room temperature until solution is effected. The reaction mixture is stirred for an additional 15 minutes and 1 ml. of pyridine is added. The solution is concentrated to half-volume and 10 ml. of water is added. Concentration is continued until crystallization occurs. About 100 ml. of water is added and the product is filtered, washed well with water, and dried to give 3-methoxy-3,5-pregnadiene-11β,17α,21-triol-20-one.

Various changes and modifications may be made in carrying out the present invention without departing from the spirit and scope thereof. Insofar as these changes and modifications are within the purview of the annexed claims, they are to be considered as part of our invention.

I claim:

1. A process for the preparation of a compound selected from the group consisting of 3-lower alkoxy-16-α-methyl-3,5-pregnadiene-11β,17α,21-triol-20-ones and the lower alkanoyl esters thereof which comprises reacting a compound consisting of a 16α-methyl-4-pregnene-11β,17α,21-triol-3,20-dione and the lower alkanoyl esters thereof with a lower alkyl orthoformate in the presence of a strong acid catalyst and an alkanol, said alkanol corresponding to the alkyl radical of the alkyl orthoformate and being the sole reaction solvent.

2. The process according to claim 1 wherein the alkyl orthoformate is methyl orthoformate and the alkanol is methanol.

3. The process according to claim 1 wherein the alkyl orthoformate is ethyl orthoformate and the alkanol is ethanol.

4. The process according to claim 1 wherein the alkyl orthoformate is n-propyl orthoformate and the alkanol is n-propanol.

References Cited in the file of this patent

UNITED STATES PATENTS

| 2,363,338 | Koster | Nov. 21, 1944 |
| 2,835,667 | Ercoli et al. | May 20, 1958 |
| 2,847,429 | Ercoli et al. | Aug. 12, 1958 |

OTHER REFERENCES

Loewenthal: Tetrahedron, vol. 6, No. 4, page 291 (1959).

Fieser et al: Steroids, page 603 (1959), Reinhold Publishing Co., New York.

Fieser et al.: Steroids, page 699, 1959 ed., Reinhold Publishing Co., New York, N.Y.